US012003936B2

(12) United States Patent
Buss

(10) Patent No.: US 12,003,936 B2
(45) Date of Patent: Jun. 4, 2024

(54) ELECTRODYNAMIC LOUDSPEAKER

(71) Applicant: Karsten Buss, Hirschhorn (DE)

(72) Inventor: Karsten Buss, Hirschhorn (DE)

( * ) Notice: Subject to any disclaimer, the term of this patent is extended or adjusted under 35 U.S.C. 154(b) by 152 days.

(21) Appl. No.: 17/628,569

(22) PCT Filed: Jul. 22, 2020

(86) PCT No.: PCT/DE2020/100644
§ 371 (c)(1),
(2) Date: Jan. 20, 2022

(87) PCT Pub. No.: WO2021/013305
PCT Pub. Date: Jan. 28, 2021

(65) Prior Publication Data

US 2022/0264228 A1 Aug. 18, 2022

(30) Foreign Application Priority Data

Jul. 25, 2019 (DE) ......................... 102019120137.3

(51) Int. Cl.
*H04R 9/02* (2006.01)
*H04R 9/04* (2006.01)
*H04R 9/06* (2006.01)

(52) U.S. Cl.
CPC ............. *H04R 9/025* (2013.01); *H04R 9/046* (2013.01); *H04R 9/06* (2013.01)

(58) Field of Classification Search
CPC ........... H04R 9/025; H04R 9/046; H04R 9/06
See application file for complete search history.

(56) References Cited

U.S. PATENT DOCUMENTS

| | | | | |
|---|---|---|---|---|
| 5,909,496 | A | 6/1999 | Kishigami | |
| 10,609,488 | B1 * | 3/2020 | Concessi | G06F 3/016 |
| 2014/0339924 | A1 * | 11/2014 | Peteul-Brouillet | H02K 1/12 310/12.01 |

FOREIGN PATENT DOCUMENTS

| | | | |
|---|---|---|---|
| DE | 102011011115 | A1 | 8/2012 |
| EP | 2965537 | A1 | 1/2016 |
| GB | 1045807 | A | 10/1966 |
| WO | 9930533 | A1 | 6/1999 |

* cited by examiner

*Primary Examiner* — Sunita Joshi
(74) *Attorney, Agent, or Firm* — Michael Soderman

(57) ABSTRACT

An electrodynamic loudspeaker comprising a housing, at least one magnet, each with a voice coil arranged in this in an axially moveable manner, a diaphragm and a loudspeaker frame for each magnet). The shell surface of the at least one magnet is surrounded by a commutating coil of an electrically conductive wire, which consists of at least two opposing windings coaxially surrounding the magnet. After wrapping the two opposing wire ends, these two opposing wire ends are connected into an inflection point at the point the two opposing wire ends respectively meet after each are wrapped by 180° in such a way that they are led in the opposite direction to the next inflection point, which is diametrically opposite to the previous inflection point. After the last winding formed, these two wire ends are connected to each other.

1 Claim, 3 Drawing Sheets

ELECTRODYNAMIC LOUDSPEAKER

CROSS REFERENCE TO RELATED APPLICATIONS

This application is the U.S. national stage of International Application No. PCT/DE2020/100644, filed on 2020 Jul. 22. The international application claims the priority of DE 102019120137.3 filed on 2019 Jul. 25; all applications are incorporated by reference herein in their entirety.

BACKGROUND

The invention is based on an electrodynamic loudspeaker according to the genre of the generic term of claim 1.

Electrodynamic loudspeakers convert electrical signals into analogue sound waves. They are known in a wide variety of embodiments, power ratings and for a wide variety of applications, and are installed in headphones as spatially small-sized embodiments, in vehicles and home hi-fi systems as medium-sized embodiments, and in large loudspeakers of high-performance acoustic systems in correspondingly large embodiments.

Regardless of their size and technical quality, the basic principle of any loudspeaker is to convert the electrical signal received from an amplifier into sound waves.

In order to come as close as possible to the original sound of the sound event when reproducing sound events via electroacoustic loudspeakers, the electronics industry has developed powerful, highly sensitive loudspeakers, the quality of which is also reflected in exorbitantly high prices. And yet, stereophony and quadrophony with loudspeakers is always just a reflection of what constitutes the original sound event. The sound experience of a hi-fi stereo system, no matter how expensive, or even the most expensive stereo headphones with conventional speakers, will always be very different from the natural, original sound experience. The inventor and applicant of the loudspeaker assembly as a wave field generator in accordance with DE 10 2011 011 115 A1 describes this problem and the causes thereof very clearly when presenting prior art with regard to its invention. In its view, an acoustic transducer in the form of a loudspeaker is not capable of converting "within the human hearing spectrum the electrical image of sound supplied to it into equivalent sound waves" (DE 10 2011 011 115 A1, para. 0008). In the following, it analyses the reasons for the non-true-to-the-original reproduction of the received sound signals by electrodynamic loudspeakers and comes to the conclusion of generating sound colours perceived as real with the aid of generating sound patterns corresponding to the natural pattern formation of the sound wave field that also correspond to the human brain pattern. A wave field generator consisting of interference resonators is proposed as a technical implementation.

The disadvantage of such a wave field generator is the extremely high technical effort that the design of such a generator requires. In addition, a technical implementation has not yet become known.

A loudspeaker with a diaphragm that is moved by a vibrating device is also known. The oscillating device has at least one permanent magnet and one voice coil arranged within the permanent magnet and connected to the diaphragm. The voice coil consists of an insulated flat carrier plate, wherein the plane of the coil essentially runs in the direction of the oscillation of the diaphragm. The windings of the coil are formed by forward and backward paths on the carrier plate. To enhance the electromagnetic effect, a parallel coil is arranged on the rear side of the carrier plate (GB 1 045 807 A).

The invention is based on the object of modifying the loudspeakers in such a way that they also have a much higher quality in the rendering and reproduction of the original sound of a sound event compared to high-quality loudspeakers, regardless of whether it has to do with a single human voice, a choir, the sound of a solo instrument, a group of instruments or an orchestra so that they offer the listener a natural sound experience that is significantly closer to the original sound.

The object is achieved according to the invention by the characteristic features of Claim 1.

SUMMARY

The invention is based on an electrodynamic loudspeaker comprising a housing, at least one magnet (2) each with a voice coil arranged in this in an axially moveable manner, a diaphragm and a loudspeaker frame (4) for each magnet (2).

According to the invention, the shell surface of at least one magnet (2) is surrounded by a commutating coil (1) of an electrically conductive wire (5), which consists of at least two opposing windings coaxially surrounding the magnet (2). After wrapping the two opposing wire ends (7), these two opposing wire ends (7) are connected into an inflection point (8) at the point the two opposing wire ends respectively meet after each are wrapped by 180° in such a way that they are led in the opposite direction to the next inflection point (9), which is diametrically opposite to the previous inflection point (8). After the last winding formed, these two wire ends (7) are connected to each other.

This commutating coil (1) achieves a significant improvement in the reproduction of speech and music with regard to a natural sound pattern. The sound of speech and music is perceived as being softer and more natural, in short, less synthetic.

DETAILED DESCRIPTION

According to the invention, the shell surface of at least one magnet is surrounded by a commutating coil made of an electrically conductive wire. The commutating coil consists of at least two opposing windings concentrically surrounding the magnet, wherein these two opposing wire ends are connected into an inflection point at the point the two opposing wire ends respectively meet after each are wrapped by 180°. At this inflection point, their winding direction is reversed so that the wire ends are guided in the opposite direction to the next inflection point, which is diametrically opposite to the previous inflection point. After the last turn, the two ends of the wire are connected to each other.

This commutating coil, which is relatively easy to manufacture on a technical level and easy to attach to the magnet of a loudspeaker, achieves a significant improvement in the reproduction of speech and music with regard to a natural sound image. The sound of speech and music is perceived as being softer and more natural, in short, less synthetic.

In accordance with an advantageous embodiment of the invention, the wraps of the commutating coil are continued after each inflection point without intersecting in such a way that the commutating coil, similar to the gradient of a thread on the shell surface of a screw, spreads on the shell surface of the magnet in the axial direction without intersecting.

However, not intersecting is not a necessary condition for achieving the above-mentioned improvement of the natural sound pattern.

Further advantages and favourable embodiments of the invention can be found in the following description, the claims and the drawings.

BRIEF DESCRIPTION OF THE DRAWINGS

In the following exemplary embodiment, the preparation of the object according to the invention is shown in the drawings and is explained in more detail below. The figures show.

DETAILED DESCRIPTION OF THE PREFERRED EMBODIMENTS

Figure 1:
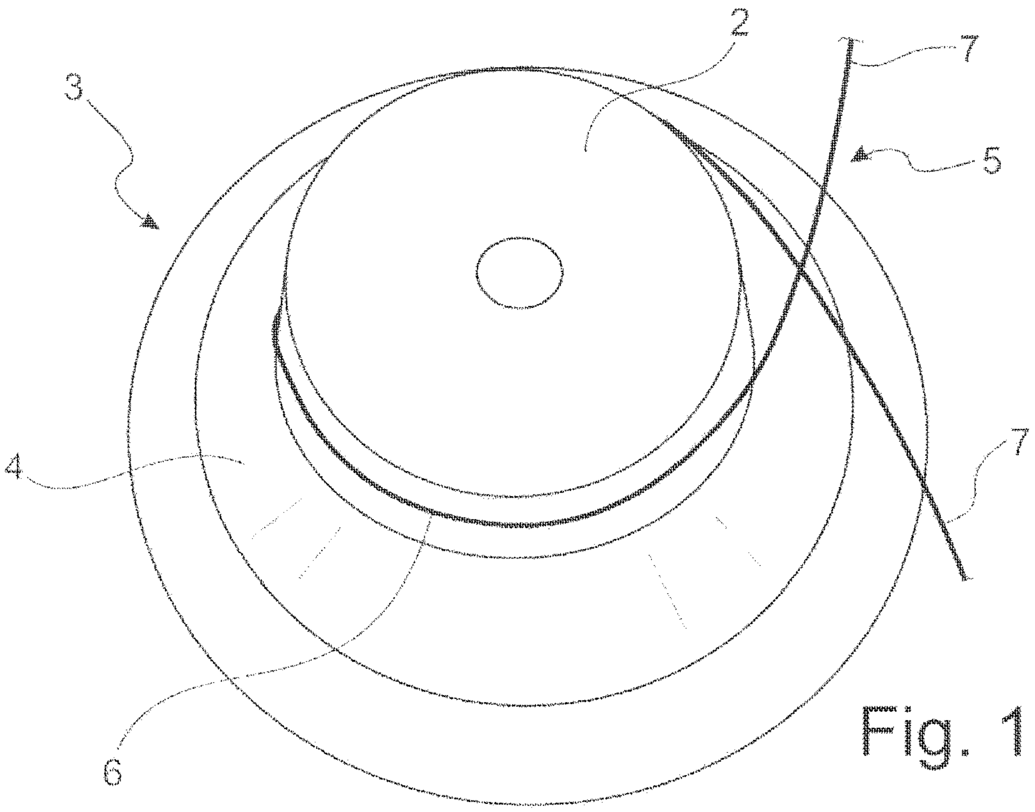
FIG. 1 the first wrap of a magnet of a loudspeaker.
Figure 2:
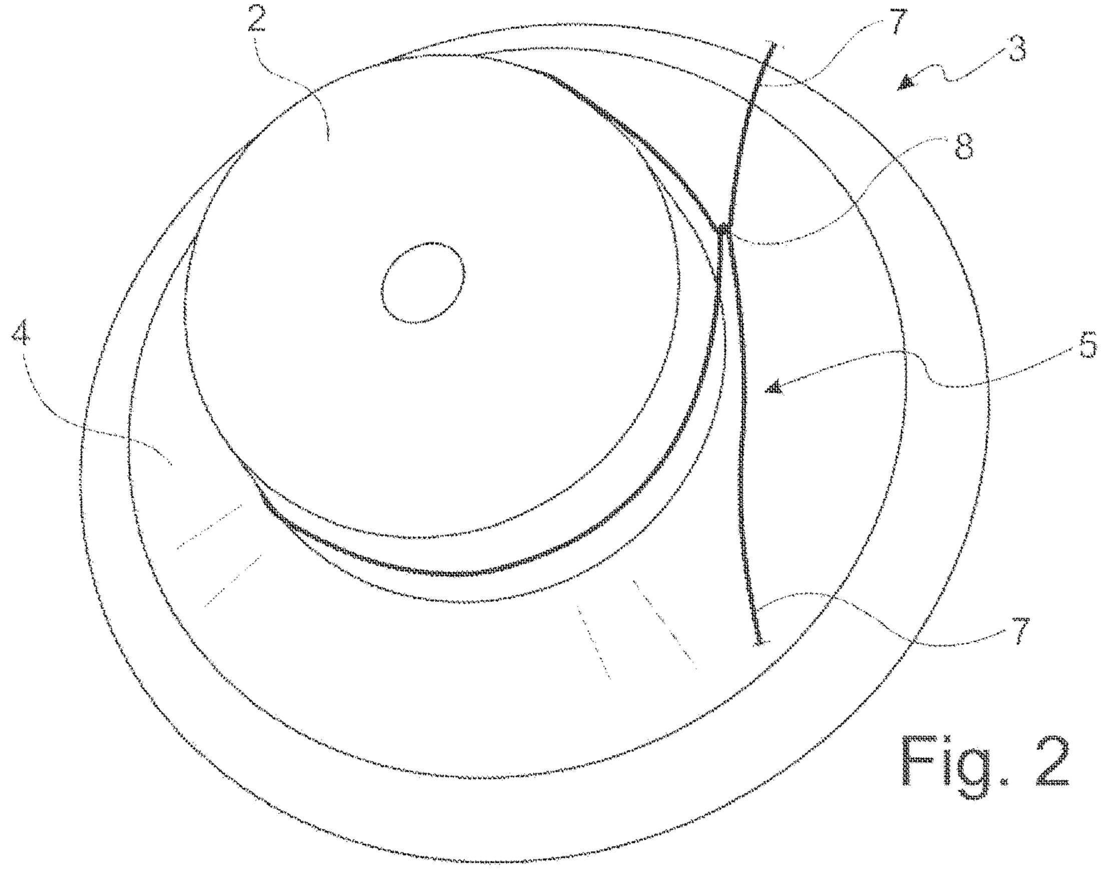
FIG. 2 the first inflection of the wires.
Figure 3:
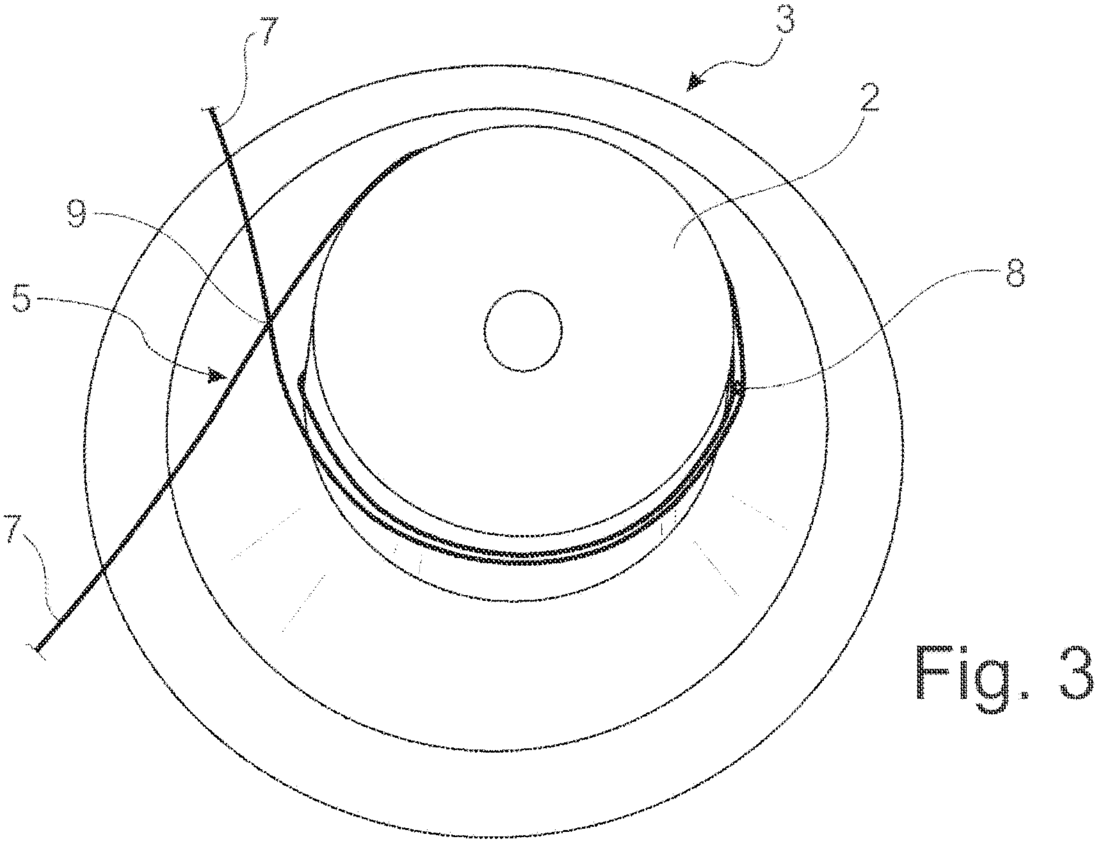
FIG. 3 the second inflection of the wires.
Figure 4:
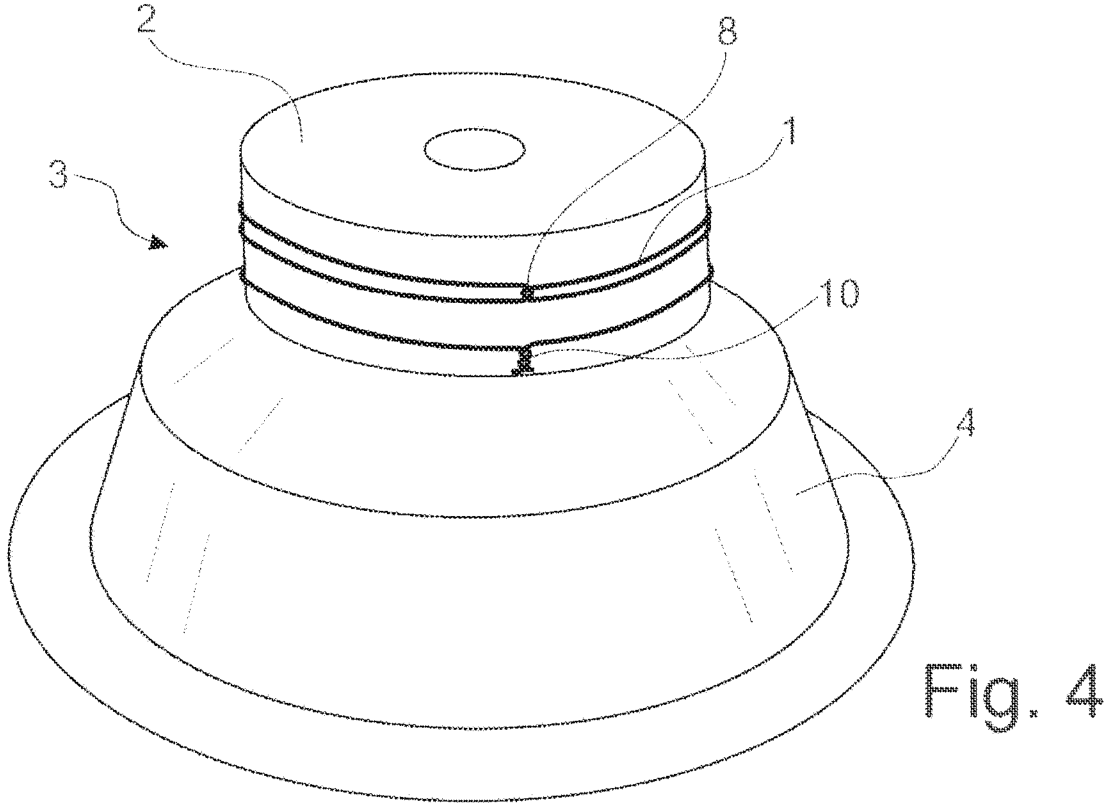
FIG. 4 the twisting of the wires.

FIGS. 1 to 4 show a manual production of a triple commutating coil 1 on a magnet 2 of a loudspeaker 3, which is shown in all four drawings lying on its loudspeaker frame 4. At the beginning, as can be seen from FIG. 1, a wire 5 consisting of an electrically conductive material, in the present example made of silver, is placed in a loop 6 with the approximately identically long end 7 around the magnet 2. The length of the wire 5 is greater than three times the circumference of the magnet 2. At the point of their contact at the circumference of the magnet 2 (FIG. 2), the two wire ends 7 are connected to each other in such a way that their winding direction is reversed. In the present example, the two wire ends 7 after this first inflection point 8 are guided along the jacket of the magnet 2 in such a way that they do not intersect. At their subsequent point of contact, which is at the diametrically opposite position to the first inflection point 8 after each 180° wrap angle, the two wire ends 7 are connected to each other to form a second inflection point 9 (FIG. 3) and again guided in the opposite direction, also again without intersecting, along the shell of the magnet 1. After a wrap angle of 180° each again, they reach the first inflection point 8, where they are finally connected to each other to form a permanent connection 10, thereby being twisted in the present example (FIG. 4).

Figure 5:
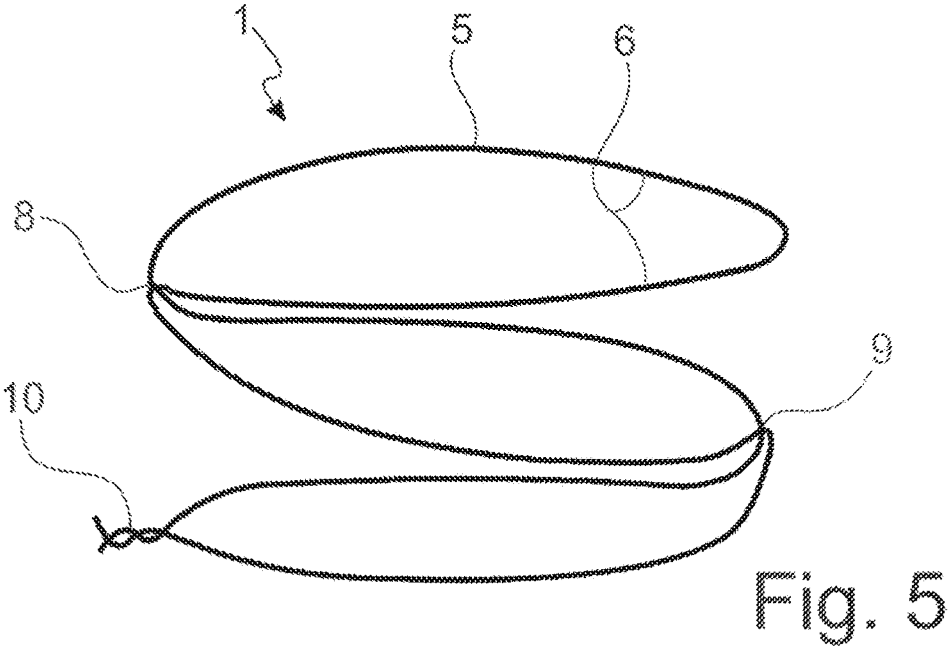
FIG. 5 a commutating coil removed from the magnet.

FIG. 5 shows a triple commutating coil 1 pulled away from magnet 2 in a state slightly pulled apart in the axial direction in such a way that the two inflection points 8, 9 opposite to each other in the mounted state can be better recognized. From this illustration, it can also be seen that the wound wire 5 does not otherwise intersect except at the inflection points 8, 9 since the winding of the magnet 2 takes place in an ascending or descending manner.

Figure 6:
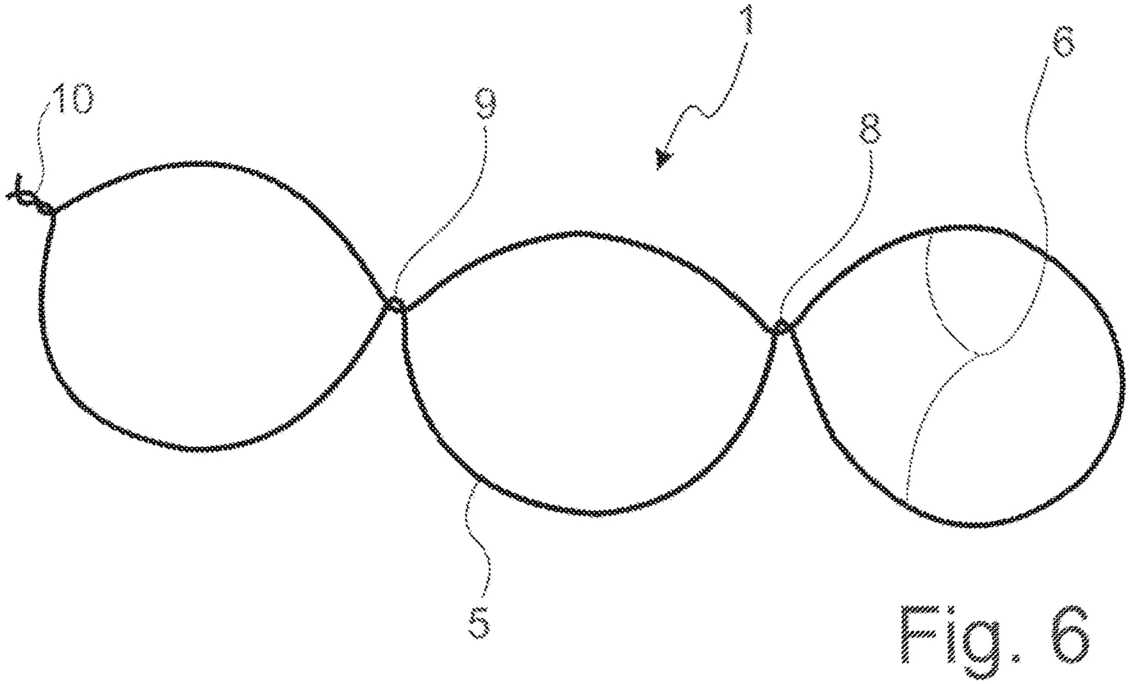
FIG. 6 a folded-open commutating coil.

FIG. 6 shows the triple commutating coil 1 in the "folded-open" state so that the two inflection points 8, 9 and the final connection 10 of the two wire ends 7 can be clearly recognized by twisting.

Of course, the commutating coil can also be manufactured externally by machine according to the diameter of the respective magnet 2 and can be pushed and fixed on the magnet 2 as a finished component.

All features shown here may be crucial to the invention, both individually as well as in any combination with one another.

LIST OF REFERENCE NUMERALS

1 triple commutating coil
2 magnet
3 loudspeaker
4 speaker frame
5 wire
6 loop
7 wire ends
8 first inflection point
9 second inflection point
10 connection

The invention claimed is:

1. Electrodynamic loudspeaker, comprising a magnet (2) with a voice coil arranged in an axially moveable manner respectively, a diaphragm for each magnet (2) and a loudspeaker frame (4) for each magnet (2), characterized in that the shell surface of the at least one magnet (2) is surrounded by a commutating coil (1) made of an electrically conductive wire (5), which consists of at least two opposing windings surrounding the magnet (2) in a coaxial manner, wherein, after wrapping each of the two opposing wire ends (7) by 180° at the point they meet, these two opposing wire ends (7) are connected into an inflection point (8) in such a way that they are guided in the opposing direction to the next inflection point (9), which is located diametrically opposite to the previous inflection point (8), and are connected to one another after the last winding has been formed, wherein the wraps of the commutating coil (1) are continued after the inflection point (8, 9) without intersecting.

* * * * *